US006419615B1

(12) United States Patent
Chen et al.

(10) Patent No.: US 6,419,615 B1
(45) **Date of Patent: *Jul. 16, 2002**

(54) ELECTROSTATIC CHARGE-SUPPRESSING FLUOROPLASTIC FUSER ROLLER

(75) Inventors: Jiann H. Chen, Fairport; Joseph A. Pavlisko, Pittsford; Charles C. Anderson, Penfield; Robert A. Lancaster, Hilton, all of NY (US)

(73) Assignee: Nex Press SolutionsLLC, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/609,563

(22) Filed: Jun. 30, 2000

(51) Int. Cl.[7] ................................................ B23P 15/00
(52) U.S. Cl. .............................. 492/56; 492/53; 492/54
(58) Field of Search .............................. 492/53, 56, 59, 492/54; 399/333, 324, 335, 328

(56) References Cited

U.S. PATENT DOCUMENTS 4,970,559 A * 11/1990 Miyabayashi
5,735,945 A * 4/1998 Chen et al.
5,863,626 A * 1/1999 Yamasaki .................... 492/53
5,897,477 A * 4/1999 Nakatogawa et al. ......... 492/56
6,004,669 A * 12/1999 Rokutan et al. .............. 492/53
6,013,201 A * 1/2000 Hayashida et al. ........... 492/56
6,041,210 A * 3/2000 Chen et al. ................. 399/333
6,122,473 A * 9/2000 Goseki et al. .............. 399/286
6,146,320 A * 11/2000 Yoshikawa et al. ........... 492/56

OTHER PUBLICATIONS

"Plastics Additives and Modifiers Handbook", edited by Jesse Edenbaum, 1992, p. 626.

* cited by examiner

*Primary Examiner*—I Cuda-Rosenbaum

(57) ABSTRACT

A toner fuser roller with suppressed electrostatic charge build-up for fixing a toner image to a receiver comprising:

(a) a core; and (b) an overcoat layer formed over the core and defining a surface that contacts the receiver, the overcoat layer including electrically conductive fine powder in an amount of 10 to 29 weight percent so as to make the overcoat layer electrically conductive and suppress electrostatic charge build-up and improve thermal conductivity.

9 Claims, 1 Drawing Sheet

ELECTROSTATIC CHARGE-SUPPRESSING FLUOROPLASTIC FUSER ROLLER

FIELD OF THE INVENTION

This invention relates in general to electrostatographic imaging and in particular to the fusing of toner images. More specifically, this invention relates to fuser rollers having improved static charge suppression characteristics.

BACKGROUND OF THE INVENTION

In a typical electrostatographic reproducing apparatus, a light image of an original to be copied is recorded in the form of an electrostatic latent image upon a photosensitive member, and the latent image is subsequently rendered visible by the application of a thermoplastic resin toner powder. The visible toner image is initially in a loose powdered form that can be easily disturbed or destroyed but is usually fixed or fused on a receiver, which may be, for example, plain paper.

In order to fuse the toner particle image permanently by heat onto a receiver surface, it is necessary to elevate the temperature of the toner particles to a point at which they coalesce and become tacky. This heating causes the toner to flow to some extent into fibers or pores on the receiver surface. Thereafter, as the toner material cools, its solidification causes it to be firmly bonded to the receiver surface.

Typically, thermoplastic resin particles are fused to the substrate by heating, generally to a temperature of about 90° C. to 160° C., and sometimes higher, depending on the softening range of the particular resin used in the toner. It is not desirable, however, to exceed a temperature of about 200° C. because of the tendency of the receiver to discolor at such elevated temperatures, particularly if it includes a paper substrate.

Several approaches to thermal fusing of toner images have been described in the prior art, including the substantially concurrent application of heat and pressure. This may be achieved by, for example, a pair of rollers, a fuser roller and a pressure roller that are maintained in pressure contact, a fuser plate or belt member in pressure contact with a pressure roller, and the like. Heat may be applied to one or both of the rollers, plates, or belts. The fusing of the toner particles takes place when the proper combination of heat, pressure and contact time are provided. The balancing of these parameters to bring about the fusing of the toner particles is well known in the art and can be adjusted to suit particular machines or process conditions.

During operation of a fusing system in which heat is applied to cause thermal fusing of the toner particles onto a support, both the toner image and the receiver are passed through a nip formed between the roller pair, or between the pressure roller and fuser plate or belt member. The concurrent transfer of heat and the application of pressure in the nip effects the fusing of the toner image onto the receiver. It is important in the fusing process that no offset of the toner particles from the support to the fuser member take place during normal operations. Toner particles offset onto the fuser member may subsequently transfer to other parts of the machine or onto the receiver in subsequent copying cycles, thereby increasing the background or interfering with the material being copied there. "Hot offset" occurs when the temperature of the toner is raised to a point where the toner particles liquefy during the fusing operation, and a portion of the molten toner remains on the fuser member. The extent of hot offset is a measure of the release property of the fuser roll; accordingly, it is desirable to provide a fusing surface having a low surface energy to enable the necessary release.

For further improvement in the release properties of the fuser member, it is customary to apply release agents to the fuser member surface to ensure that the toner is completely released from the surface during the fusing operation. Typically, release agents for preventing toner offset are applied as thin films of, for example, silicone oils. U.S. Pat. No. 3,810,776 describes a release agent of a low viscosity silicone oil in which is dispersed a high viscosity component such as zinc or aluminum stearate or behenate. Polyorganosiloxanes containing various functional groups that interact with a fuser member surface are well known in the art. For example, mercapto-functionalized polyorganosiloxanes are disclosed in U.S. Pat. No. 4,029,827, and analogous amino-functionalized materials are described in U.S. Pat. Nos. 5,512,409 and 5,516,361. Silicone release oils containing other functional groups such as carboxy, hydroxy, epoxy, and isocyanate are described in U.S. Pat. Nos. 4,101,686 and 4,185,140.

In a fusing system including a nip formed by a pair of rollers, the pressure roller is commonly provided with a surface layer, or sleeve, of a fluorocarbon plastic such as, for example, a perfluoroalkoxy (PFA) polymer, a fluoroethylenepropylene (FEP) polymer, or a tetrafluoroethylene (TFE) polymer over a more resilient blanket layer such as, for example, a silicone rubber. The surface of the fuser roller, which is often but not necessarily more resilient than the pressure roller surface, may comprise, for example, a silicone rubber or a fluoroelastomer.

Regardless of the materials employed, contact between the roller surfaces during passage of a toner image receiver, usually paper, through the nip causes an electrostatic charge to build up on the fuser roller surface. The magnitude and polarity of the electrostatic charge depends at least in part on the relative position of the pressure and fuser roller surface materials in the triboelectric series. In L. B. Schein, *Electrophotography and Development Physics*, 2nd edition, Springer-Verlag, New York, 1992, page 78, is presented a triboelectric series table showing a silicone elastomer with silica filler at the extreme positive end of the series and polytetrafluoroethylene at the extreme negative end.

Generation of an electrostatic charge at the roller nip may, depending on the magnitude and polarity of the charge on the fuser roller surface and the surface charge properties of the toner composition particles employed, result in serious problems of toner offset or paper jamming, or both. It is therefore desirable to prevent or suppress the buildup of static charge at the nip to keep it at a very low level, ideally zero.

U.S. Pat. No. 4,970,559 describes a mixture for forming a roller layer that comprises an organic polymer and an inorganic fine powder carrying an absorbed liquid antistatic agent. In commonly assigned U.S. Pat. No. 5,735,945, a static charge-suppressing release agent for pressure and fuser rollers is described. A problem with using static-charge suppressing release agents is that they have to be continuously applied in the correct amounts. If an incorrect amount of release agent is applied image artifacts can result.

Commonly-assigned U.S. Pat. No. 6,041,210 describes a toner fusing member having an overcoat layer including electrically conductive fine powders having a weight percent between about 30 to 80 weight percent. Although these toner fusing members have proved effective in suppressing electrostatic charge build up, they have a problem in that there can be toner contamination.

Thus, there is a need to provide an improved toner fusing member that suppresses electrostatic charge build-up while minimizing the problem of toner contamination. It is toward an improved toner fusing member that the present invention is directed.

SUMMARY OF THE INVENTION

It is an object of the present invention to provide fuser rollers which effectively minimize both electrostatic charge build-up and toner contamination.

This object is achieved in a toner fuser roller with suppressed electrostatic charge build-up for fixing a toner image to a receiver, the toner fuser roller comprising:

(a) a core; and (b) an overcoat layer formed over the core and defining a surface that contacts the receiver, the overcoat layer including electrically conductive fine powder in an amount sufficient to make the overcoat layer cross the percolation threshold and become electrically conductive and suppress electrostatic charge build-up and improve thermal conductivity.

In accordance with the invention, a fuser roller for electrostatography that is effective to prevent or substantially suppress electrostatic charging of toner fuser rollers during fusion of thermoplastic toner on a receiver comprises an elastomer and an inorganic fine powder that is electrically conductive. The electrically conductive fine powder in the fuser roller preferably comprises about 10 to 29 weight percent of the total dry weight of the composition, more preferably about 12 to 25 weight percent, and still more preferably about 15 to 23 weight percent.

By preventing or substantially suppressing electrostatic charging of a fuser roller surface, the present invention provides improved copier machine performance and copy quality.

DETAILED DESCRIPTION OF THE PREFERRED EMBODIMENT

The term "percolation threshold" means the critical point at which electrically conductive fine powder in a matrix reach a high enough concentration to achieve clustering and then create a sufficient electron path, thereby allowing current to flow through the matrix. See, page 626, "Plastic Additives and Modifiers Handbook", edited by Jesse Edenbaum, Van Nostrand Reinhold, publishers, (1992).

Figure 1:
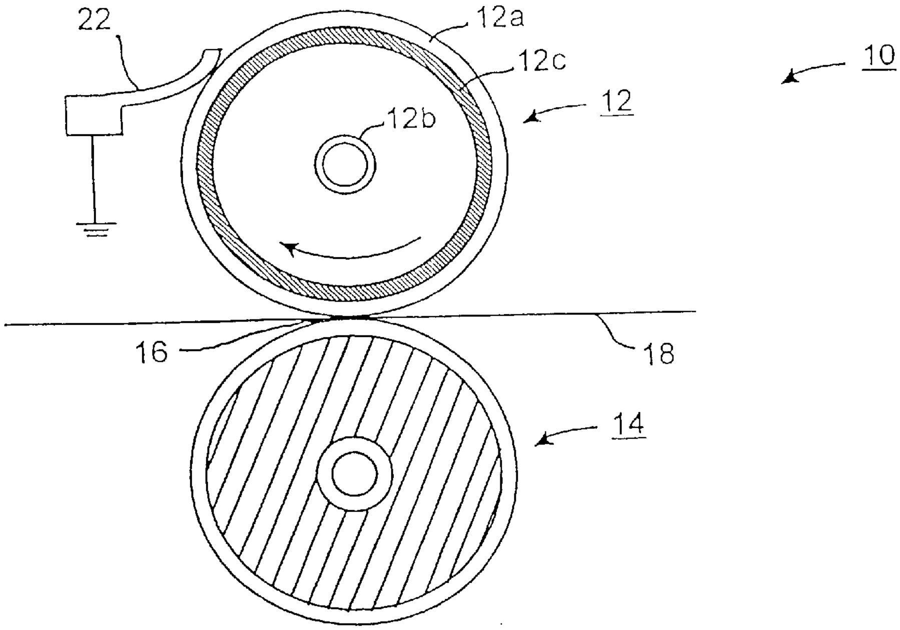
FIG. 1 is a cross-sectional view of a fusing system having a fuser roller and a pressure roller which forms a nip wherein a toner image is fixed to a receiver and showing a first way of grounding the fuser roller.

Turning now to FIG. 1, where a simplified fusing system 10 in accordance with the present invention is shown. The fusing system 10 includes a toner fuser roller 12, and a pressure roller 14 which forms a nip 16. At the nip 16 a toner image on a receiver 18 is fixed by pressure to the receiver 18. Heat can also be applied at the nip 16 to aid in this fixing process. As thus far described the fusing system 10 is conventional. However, the toner fuser roller 12 has an improved overcoat layer 12*a* with conductive particles in an amount selected to make the overcoat layer electrically conductive, suppress electrostatic charge build-up and improve thermal conductivity. The toner fuser roller 12 also has a conductive core 12*b* that can be made of metal. Although it is not necessary, a base cushion 12*c* often provides advantages in the fixing process and is formed directly on the core 12*b*. In any event the toner fuser roller 12 has an outer overcoat layer 12*a* which contains electrically conductive fine powders. In order to ground the toner fuser roller 12, a conductive flat spring 22 typically made of metal, physically contacts the top surface of the overcoat layer 12*a*. The conductive flat spring 22 is connected to machine ground.

Figure 2:
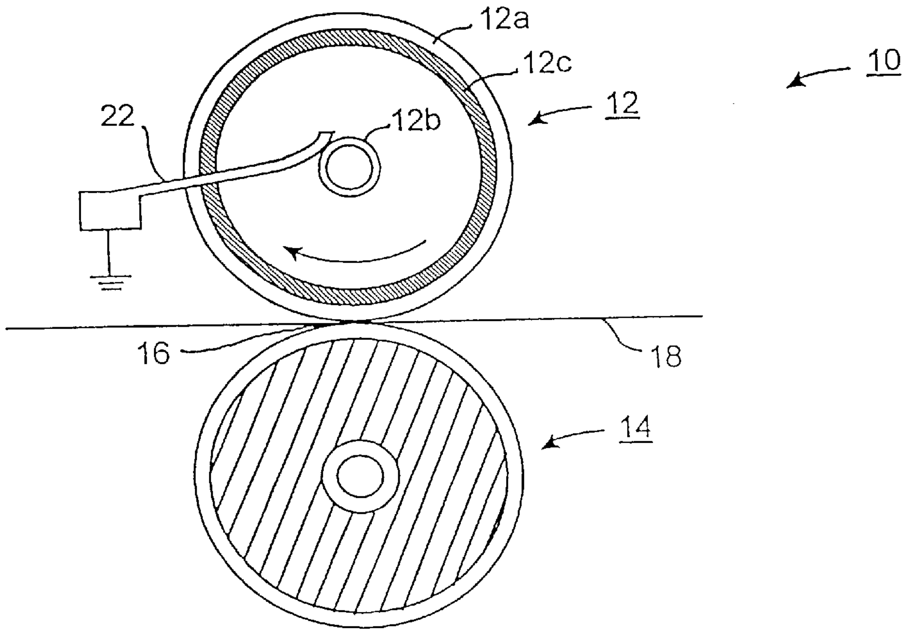
FIG. 2 is a cross-sectional view of a fusing system having a fuser roller and a pressure roller which forms a nip wherein a toner image is fixed to a receiver and showing a second way of grounding the fuser roller.

FIG. 2 is similar to FIG. 1 and where parts correspond they carry the same numbers. In this embodiment, grounding is achieved in a second way by having the flat conductive spring 22 contact the core 12*b*. Also, in order to complete an electrical connection the base cushion 12*c* has to be conductive. Electrically conductive fine powder can also be included in the base cushion 12*c* in an amount sufficient to make it electrically conductive so that charge can be directly coupled from the surface of the toner fuser roller 12 through the overcoat layer 12*a* and the base cushion 12*c* and out to ground by way of the core 12*b*.

The electrically conductive fine powders of the present invention include doped-metal oxides, metal oxides containing oxygen deficiencies, metal antimonates, conductive nitrides, carbides, or borides. These conductive fine powders exhibit electronic conductivity which depends primarily on electronic mobilities rather than ionic mobilities, and therefore, the observed conductivity is independent of relative humidity and only slightly influenced by ambient temperature. The toner fuser roller 12 of the present invention has superior antistatic properties compared with the roller layer compositions described in the aforementioned '559 patent which contain an inorganic fine powder carrying an absorbed liquid antistatic agent that exhibits humidity dependent, ionic conductivity. Representative examples of electrically conductive fine powders suitable for use in the present invention include electronically conductive $TiO_2$, $SnO_2$, $Al_2O_3$, $ZrO_3$, $In_2O_3$, MgO, $ZnSb_2O_6$, $InSbO_4$, $TiB_2$, $ZrB_2$, $NbB_2$, $TaB_2$, $CrB_2$, MoB, WB, $LaB_6$, ZrN, TiN, TiC, and WC. Preferred are $SnO_2$, $In_2O_3$, $ZnSb_2O_6$, $InSbO_4$, and TiN or $SnO_2$, $Al_2O_3$, $In_2O_3$, MgO, $ZnSb_2O_6$, $InSbO_4$, and TiN.

Suitable, commercially available conductive fine powders include antimony-doped tin oxide such as STANOSTAT® powders from Keeling & Walker, Ltd., T1 from Mitsubishi Metals Corp., and FS-10P from Ishihara Sangyo Kaisha Ltd., and zinc antimonate such as Celnax CX-Z from Nissan Chemical Co., and others.

Also included are powders having an electrically conductive metal oxide shell such as antimony-doped tin oxide coated onto a non-electrically conductive metal oxide particle core such as potassium titanate or titanium dioxide. Such core-shell particles are described in U.S. Pat. Nos. 4,845,369 and 5,116,666, and are available commercially, for example, as Dentall® WK200 from Otsuka Chemical, W1 from Mitsubishi Metals Corp., and Zelec® ECP-T-MZ from DuPont.

The electrically conductive fine powders of the invention may comprise particles that are substantially spherical in shape, or they may be whiskers, fibers, or other geometries. The conductive fine powder has an average particle size less than about 20 $\mu$m, more preferably less than about 5 $\mu$m. The fine powders used in the practice of the invention have a powder resistivity of about $10^5 \cdot \Omega$cm or less.

The base cushion 12*c* can be formed of an elastomer such as a silicone rubber or a fluoroelastomer. Suitable silicone rubbers include, for example, EC-4952 from Emerson Cumming and Silastic™ E from Dow Corning. Suitable fluoroelastomers include, for example, Fluorel™ elastomers from 3M, Vyton™ fluoropolymers from DuPont, and Supra™ blend of PTFE and PFA fluoropolymers from DuPont. In order to make the overcoat layer 12*a* in FIG. 1 conductive and the overcoat layer 12*a* and base cushion 12*c* in FIG. 2 conductive, a sufficient amount of conductive powder has to be added to these materials. This can be determined empirically by adding particles and the conductivity of the layer or cushion can be measured and there is a region where it rapidly changes from non-conductive to conductive. This is often referred to in the art as "the percolation threshold." The overcoat layer 12*a* of FIG. 1 and both the overcoat layer 12*a* and base cushion 12*c* of FIG. 2 preferably comprises about 10 to 29 weight percent, more preferably about 12 to 25 weight percent, and still more preferably about 15 to 23 weight percent of the electrically conductive fine powder. With these amounts both of these elements become highly conductive and are capable of charge suppression.

The overcoat layer 12*a* in this invention includes a cured fluorocarbon thermoplastic random copolymer having subunits with the following general structures:

$$—(CH_2CF_2)_x— \text{ (vinylidene fluoride subunit ("VF"))},$$

$$—(CF_2CF_2)_z— \text{ (tetrafluoroethylene subunit ("TFE")), and}$$

$$—(CF_2\overset{CF_3}{\overset{|}{C}F})_y— \text{ (hexafluoropropylene subunit ("HFP"))}.$$

In these formulas, x, y, and z are mole percentages of the individual subunits relative to a total of the three subunits (x+y+z), referred to herein as "subunit mole percentages", wherein:

x is from 1 to 50 or 60 to 80 mole percent, y is from 10 to 90 mole percent, z is from 10 to 90 mole percent, and x+y+z equal 100 mole percent.

The curing agent can be considered to provide an additional "cure-site subunit", however, the contribution of these cure-site subunits is not considered in subunit mole percentages. In the fluorocarbon copolymer, x has a subunit mole percentage of from 1 to 50 or 60 to 80 mole percent, y has a subunit mole percentage of from 10 to 90 mole percent, and z has a subunit mole percentage of from 10 to 90 mole percent. In a currently preferred embodiment of the invention, subunit mole percentages are: x is from 30 to 50 or 70 to 80, y is from 10 to 20, and z is from 10 to 50; or more preferably x is from 40 to 50, y is from 10 to 15, and z is 40 to 50. In the currently preferred embodiments of the invention, x, y, and z are selected such that fluorine atoms represent at least 65 percent of the total formula weight of the VF, HFP, and TFE subunits. The conductive fine powder is blended into the fluorocarbon thermoplastic random copolymers as they are being formed. Typically the fluorocarbon thermoplastic random copolymers are milled and during this milling process it is convenient to add the conductive fine powder.

In addition to the fluorocarbon thermoplastic random copolymer and the conductive fine powder, the overcoat layer 12*a* further includes a bisphenol residue curing agent, a particular filler having zinc oxide, and aminosiloxane. By the term bisphenol residue is meant bisphenol or a derivative such as bisphenol AF. The aminosiloxane is an amino functional polydimethyl siloxane copolymer comprising aminofunctional units selected from the group consisting of (aminoethylaminopropyl) methyl (aminopropyl) methyl and (aminopropyl) dimethyl.

The compositions of the invention include a particulate filler comprising zinc oxide. The zinc oxide particles can be obtained from a convenient commercial source, e.g., Atlantic Equipment Engineers of Bergenfield, N.J. In a currently preferred embodiment, the particulate zinc oxide filler has a total concentration in the compositions of the invention of from about 1 to 20 parts per hundred parts by weight of the fluorocarbon thermoplastic random copolymer (pph). Concentrations of zinc oxide much greater than 20 parts by weight will render the composition to stiff. In a particular embodiment of the invention, the composition has 3 to 15 pph of zinc oxide.

An optional release additive such as a fluorinated resin can be added to the fluorocarbon thermoplastic random copolymer-containing compositions to further improve the surface lubricity of the compositions.

To form the overcoat layer 12*a*, the electrically conductive fine powders are mixed with uncured fluorocarbon thermoplastic random copolymer, curing agent, and a particulate filler having zinc oxide, and aminosiloxane; shaped over the base cushion, and cured by air drying for 16 hours, baking with a 2.5 hour ramp to 275° C., given a 30 minutes soak at 275° C., then holding for 2 hours at 260° C.

Suitable fluorocarbon thermoplastic random copolymers are available commercially. In a particular embodiment of the invention, a vinylidene fluoride-co-tetrafluoroethylene co-hexafluoropropylene was used which can be represented as-(VF)(75)-(TFE)(10)-(HFP)(25)-. This material is marketed by Hoechst Company under the designation "THV Fluoroplastics" and is referred to herein as "THV". In another embodiment of the invention, a vinylidene fluoride-co-tetrafluoroethylene-co-hexafluoropropylene was used which can be represented as-HVF)(49)-(TFE)(41)-(HFP)(10)-. This material is marketed by Minnesota Mining and Manufacturing, St. Paul, Minn., under the designation "3M THV" and is referred to herein as "THV-200A". Other suitable uncured vinylidene fluoride-cohexafluoropropylenes and vinylidene fluoride-co-tetrafluoroethylene-cohexafluoropropylenes are available, for example, THV-400, THV-500 and THV-300.

In general, THV Fluoroplastics are set apart from other melt-processable fluoroplastics by a combination of high flexibility and low process temperatures. With flexural modulus values between 83 Mpa and 207 Mpa, THV Fluoroplastics are the most flexible of the fluoroplastics.

The molecular weight of the uncured fluorocarbon thermoplastic random copolymer is largely a matter of convenience, however, an excessively large or excessively small molecular weight would create problems, the nature of which are well known to those skilled in the art. In a preferred embodiment of the invention the uncured polymer has a number average molecular weight in the range of about 50,000 to 50,000,000.

The toner fuser roller 12 is mainly described herein in terms of embodiments in which the toner fuser roller 12 has a conductive core, a base cushion layer overlying the core, and an outer layer superimposed on the base cushion. The toner fuser roller 12 of the invention can have a variety of other configurations and layer arrangements known to those skilled in the art. For example, the base cushion could be eliminated.

The invention is further illustrated by the following Examples.

Measurement of Electrostatic Charge Generation in Toner Fuser Roller Materials The electrostatic charging characteristics for several overcoats containing different materials were measured by the following procedure:

A cast film having a thickness of about 1 mil (25 μ) was prepared from each material and cut into samples approximately 2 inches (5 cm) square. The samples were cleaned with alcohol and placed in an ionizing air blower (No. 4003367 from Simco Inc.) for 1 minute prior to testing. Each sample was rubbed 20 times (back and forth) against a test pressure roller (33 cm long and 5 cm outside diameter) comprising a silicone rubber blanket and a perfluoroalkoxy (PFA) polymeric sleeve. The electrostatic charge generated on the sample surface was then measured using a Model 230 nanocoulombmeter and a Model 231 Faraday cup, manufactured by Electro-tech Systems, Inc.

EXAMPLE 1 and 2

The overcoat samples were prepared using the following procedures (all parts are by weight):

150 grams of Fluorocarbon thermoplastic random copolymer THV 200A, 1.05 grams of zinc oxide, 15.4 grams of fluorinated resin, and 4.90 grams of aminosiloxane were mixed into 230 grams of methyl ethyl ketone in a milling crock as indicated (amounts listed as parts per hundred parts (pph) of THV200A unless specified otherwise) in Table 1. THV200A is a commercially available fluorocarbon thermoplastic random copolymer which is sold by 3M Corporation. The zinc oxide particles can be obtained from a convenient commercial source, e.g., Atlantic Equipment Engineers of Bergenfield, N.J. The aminosiloxane DMS-A21 is commercially available from Gelest, Inc. The fluorinated resin is fluoroethylenepropylene (FEP) and is commercially available from DuPont. Into the above mixture, antimony-doped tin oxide powder and carbon black were added and the formulations were mixed on a two-roll mill for 48 hours to form a dispersion (the amounts of the antimony-doped tin oxide particles and carbon black are given in Table 1). The antimony-doped tin oxide powder is Keeling & Walker Inc. CPM375 having an average particle size of about 0.4 μm and an antimony content of 6–9 weight %. The carbon black is Thermax™N 990 available from R.T. Vanderbilt Co. Each of the above dispersions were mixed with 1.05 grams (3 pph) of curative 50 (a bisphenol residue, DuPont) and roll milled for 2–3 minutes. The dispersions were then immediately cast into a film and allowed to dry for several hours. The resulting layers had a thickness of several mils. Afterwards the layers were cured by air drying for 16 hours, baking with a 2.5 hour ramp to 275° C., given a 30 minutes soak at 275° C., then held 2 hours at 260° C. The resulting layer of fluorocarbon random copolymer had a thickness of 1 mil.

COMPARATIVE EXAMPLE 1 and 2

To prepare Comparative Example 1 and 2 substantially the same procedures were followed as in Example 1 and 2, with the following exceptions. As indicated in the composition listed in Table 1, Comparative Example 1 did not contain antimony-doped tin oxide and Comparative Example 2 contained less than 10 weight % antimony-doped tin oxide.

In Table 2 below are listed the measured electrostatic charge values in nanocoulombs for the above samples, obtained by rubbing each sample against the toner fuser roller. The tabulated values are the average of 8 separate measurements.

TABLE 1

| Sample | THV 200A | ZnO | Fluorinated resin | Amino siloxane | CMP375 Tin Oxide | CMP375 Wt % |
|---|---|---|---|---|---|---|
| Example 1 | 100 | 6 | 40 | 7 | 30 | 16 |
| Example 2 | 100 | 6 | 40 | 7 | 45 | 23 |
| Comparative Example 1 | 100 | 6 | 40 | 7 | 0 | 0 |
| Comparative Example 2 | 100 | 6 | 40 | 7 | 10 | 6 |

TABLE 2

| Sample | Electrostatic charge (nanocoulombs) |
|---|---|
| Example 1 | −.53 |
| Example 2 | −.42 |
| Comparative Example 1 | 13.43 |
| Comparative Example 2 | 11.44 |

As shown by the data in Table 2, a toner fuser roller material of the invention containing an electrically conductive fine powder had essentially no measurable static charge buildup compared with the comparative compositions that either did not contain any filler (+13.43 nanocoulombs for Comparative Example 1) or did not contain an amount of electrically conductive fine powders within the scope of the present invention (+11.44 nanocoulombs for Comparative Example 2)

The invention has been described in detail with particular reference to preferred embodiments thereof, but it will be understood that variations and modifications can be effected within the spirit and scope of the invention.

PARTS LIST

10 fusing system
12 fuser roller
12*a* overcoat layer
12*b* conductive core
12*c* base cushion
16 pressure roller
16 nip
18 receiver
22 spring

What is claimed is:

1. A toner fuser roller for fixing a toner image to a receiver comprising:

(a) a core, (b) an overcoat layer formed over the core having a cured fluorocarbon thermoplastic random copolymer with the following subunits:

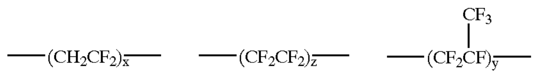

wherein:

x is from 1 to 50 or 60 to 80 mole percent, y is from 10 to 90 mole percent, z is from 10 to 90 mole percent, x+y+z equals 100 mole percent;

the overcoat layer also including electrically conductive fine powder in an amount sufficient to make the overcoat layer cross the percolation threshold and become electrically conductive.

2. The toner fuser roller of claim 1 wherein the concentration of electrically conductive fine powder in the toner fuser roller is between 10 and 29 weight percent of the total dry weight of the overcoat layer.

3. The toner fuser roller according to claim 1 wherein the electrically conductive particles are conductive fine powders selected from the group consisting of $TiO_2$, $SnO_2$, $Al_2O_3$, $ZrO_3$, $In_2O_3$, MgO, $ZnSb_2O_6$, $InSbO_4$, $TiB_2$, $ZrB_2$, $NbB_2$, $TaB_2$, $CrB_2$, MoB, WB, $LaB_6$, ZrN, TiN, TiC, and WC.

4. The toner fuser roller according to claim 3 wherein the electrically conductive particles are conductive fine powders selected from the group consisting of, $SnO_2$, $In_2O_3$, $ZnSb_2O_6$, $InSbO_4$, and TiN.

5. The toner fuser roller according to claim 3 wherein the electrically conductive particles are conductive fine powders selected from the group consisting of $SnO_2$, $Al_2O_3$, $In_2O_3$, MgO, $ZnSb_2O_6$, $InSbO_4$, and TiN.

6. The toner fuser member of claims 1, or 7 further having a base cushion disposed over the core.

7. A toner fuser roller comprising:

(a) a core;

(b) an overcoat layer formed over the core and defining a surface that contacts the receiver, the overcoat layer including electrically conductive particles in an amount selected to make the layer cross the percolation threshold and become electrically conductive;

(c) means for grounding the overcoat layer.

8. The toner fuser roller of claim 7 wherein the grounding means includes a grounded conductive flat spring in contact with the surface of the overcoat layer.

9. The toner fuser roller of claim 7, further having a base cushion, wherein the grounding means includes a conductive flat spring in contact with the core and the base cushion includes conductive fine powders in an amount selected to make the base cushion electrically conductive and suppress electrostatic charge build-up and improve thermal conductivity.

* * * * *